United States Patent [19]
Riley et al.

[11] Patent Number: 5,844,503
[45] Date of Patent: Dec. 1, 1998

[54] METHOD AND APPARATUS FOR AVIONICS MANAGEMENT

[75] Inventors: Victor A. Riley, Shoreview; Robert E. Demers, Elk River, both of Minn.

[73] Assignee: Honeywell Inc.

[21] Appl. No.: 723,601

[22] Filed: Oct. 1, 1996

[51] Int. Cl.[6] ................................................. G08B 21/00
[52] U.S. Cl. ...................... 340/945; 340/971; 340/973; 701/14
[58] Field of Search ................................. 340/945, 973, 340/974, 975, 971, 979, 963; 364/424.06, 439, 460; 701/4, 14, 120

[56] References Cited

U.S. PATENT DOCUMENTS

| | | | |
|---|---|---|---|
| 3,967,098 | 6/1976 | Harnagel et al. | 340/971 |
| 4,845,495 | 7/1989 | Bollard et al. | 340/945 |
| 5,025,382 | 6/1991 | Artz | 340/945 |
| 5,398,045 | 3/1995 | Sach et al. | 340/945 |
| 5,416,705 | 5/1995 | Barnett | 340/973 |
| 5,465,211 | 11/1995 | Byrne, Jr. | 364/424.06 |
| 5,758,297 | 5/1998 | Gaultier | 701/14 |

OTHER PUBLICATIONS

Honeywell Publication "FMZ series Flight Management System—Pilot's Operating Manual—Business and Commuter Aviation Systems", Version 02, Section V–B (Navigation (NAV) Index, pp. B–1 through B–26.

*Primary Examiner*—Jeffery A. Hofsass
*Assistant Examiner*—John Tweel, Jr.
*Attorney, Agent, or Firm*—Charles J. Ungemach

[57] ABSTRACT

A method and apparatus using a simplified language consistent with air traffic control syntax for inputting, displaying and controlling the operation of a flight management system of an aircraft to comply with the instructions received by the pilot from the air traffic controller.

5 Claims, 2 Drawing Sheets

METHOD AND APPARATUS FOR AVIONICS MANAGEMENT

BACKGROUND OF INVENTION

1. Field of the Invention

This invention relates to avionics management and more particularly to utilizing a control language consistent with air traffic control syntax to quickly and accurately command various control functions on an aircraft in accordance with commands from air traffic control.

2. Description of the Prior Art

Current flight management systems utilize a computer keyboard for programming various desired operations in an aircraft. For example, if an aircraft is progressing along a predetermined flight path and receives instructions from the air traffic controller to change course, go to a location and establish a holding pattern there, the pilot will have to figure out how to program the flight management computer in order to accomplish the command. As one example, assume the controller gave the instruction in air traffic control syntax "hold at 25 miles SW of SRP with right hand turns having 2 minute legs" meaning the pilot should program the computer to change heading and proceed to a point 25 miles south west of a waypoint identified as SRP and establish a holding pattern there in the form of a rectangular right handed flight path having lateral legs 2 minutes in length. According to the instructions found in the "FMZ series Flight Management System—Pilot's Operating Manual—Business and Commuter Aviation Systems" the pilot should figure out the following commands for use by the computer:

- Select NAV (shows set of commands)
- Select Waypoint List (lists waypoints)
- Enter "Daisy" (made up name for the point 25 miles SW of SRP)
- Select Show waypoint (shows waypoint on navigation display)
- Enter "SRP/250/25" (for use in finding waypoint daisy)
- Select P/B/D (shows above to be a point, bearing 250, 25 miles from SRP)
- Select Waypoint Daisy (gives name to point in step above)
- Select DIR (shows ways of getting there)
- Select Direct (chooses the direct route)
- Select Pattern (the type of holding pattern is to be chosen)
- Select hold (the pattern is a holding pattern)
- Select Direct (affirming way is direct)
- Enter Wdirect (specifies the quadrant of the position where the hold is to be accomplished)
- Select Quad Entry (specifies the type of interception into the pattern)
- Enter "077/RTRN" (indicates a right turn pattern)
- Select INBD CRS/DIR (inbound/course/direction)
- Enter "2.0" (indicates time of leg)
- Select legtime (assuring leg is 2 minutes long)
- Activate (causes the above instructions to occur)

As can be seen, this is a very complicated set of keyboard strokes which may take considerable time to execute. Also, the end result is not readily recognizable or understandable as the instructions sent by the air traffic controller. When, as is common, the control display unit with monitor and keyboard is located at a "head down" position, the pilot must take his eyes away from the airspace in front in order to program the computer. Because of these difficulties, the execution of the command is difficult to learn and considerably time consuming.

BRIEF DESCRIPTION OF THE INVENTION

The present invention establishes a simplified language which is recognizable in the form of air traffic control syntax for use in accomplishing a complex set of instructions in a simple and rapid manner. While the number of possible instructions which a pilot may receive is very large, nearly all of them can be split into a relatively small number of sub instructions falling into "action", "target" and "parameter" categories. "Actions" may be thought of as verbs (go, follow, select etc.), and prepositions ( to, between, from, above etc.). "Targets" may be thought of as nouns (fuel, distance, temperature, airspeed, altitude, heading, plan, etc.). "Parameters" are the units of some of the nouns (pounds, miles, degrees Celsius etc.). Sentences made up of these commands resemble the syntax used by air traffic controllers as found in the Air Traffic Control Manual "Air Traffic Controllers Handbook—FAA Document 7110.65" As such, they are much easier for the pilot to use and understand. If, for example a simple instruction required the pilot to change his altitude, or change his heading, etc. the simplified command "TO" can be understood by computer to indicate that a change in one of the aircraft variables is to follow. After pushing the action command "TO" button on the control panel in front of him, (preferably in a "head up" area such as the "glare shield" area at the bottom of the windshield), the word "TO" is displayed on a display located on the control panel (or on the navigation display.). Subsequently, a second command can be entered which may be a noun such as a new altitude, new heading, new speed etc. If necessary, a parameter command may be also added such as feet, degrees, knots etc. The second, and subsequent commands selected by the pilot are added to the "TO" displayed on a monitor so that a display of the overall desired action is shown "TO-25,000-FEET". When the pilot is satisfied from the monitor that the desired commands are correct and of the proper air traffic control syntax, he may activate the execute command and the Flight Management Computer, which will be programmed to recognize the proper syntax, will begin to operate on these commands and produce outputs which will cause the desired maneuver to be accomplished. In the above complex example, the set of instructions may be simplified to:

- Select "TO" (action showing desire to change a variable)
- Select "HOLD" (action showing desire to be in a holding pattern)
- Select "AT" (target showing holding pattern to be as follows)
- Select "25MI" (parameter)
- Select "SW" (parameter)
- Select "FROM" (action)
- Select "SRP" (target)
- Select "WITH" (action showing the type of holding pattern as follows)
- Select "RIGHT TURN" (parameter showing pattern to be in a right turn)
- Select "AND" (to indicate additional conditions)
- Select "2" (parameter showing length of the following)
- Select "MIN" (parameter showing time for the following)
- Select LEGS, (target showing part of holding pattern for 2 minute duration).

At this time, the monitor will display "TO-HOLD-AT-25-MI-SW-FROM-SRP-WITH-RIGHT-TURN-AND-2-MN- LEGS". It is seen that this is almost the way the air traffic controller would state it and is clearly understandable without a great deal of study. The pilot reading this and determining that it expresses the desired course of action now selects "GO" or "EXECUTE" (action which causes the computer to execute the program).

Alternately, the complex command could be split into several commands:

Select "TO" (action showing desire to change a variable)
Select "25MI" (parameter)
Select "SW" (parameter)
Select "FROM" (action)
Select "SRP" (target)
Select "GO"

At this time the computer would understand that the aircraft is to go to 25 miles south west of SRP.

Subsequently, the pilot could enter
Select "AT" (target to follow)
Select "25MI" (parameter)
Select "SW" (parameter)
Select "FROM" (action)
Select "SRP" (target)
Select "TO" (action indicating target to follow)
Select "HOLD" (target showing desire to be in a holding pattern)
Select "WITH" (action indicating following condition)
Select "RIGHT TURN" (parameter showing pattern to be in a right turn)
Select "AND" (action indicating more conditions to follow)
Select "2" (parameter showing length of the following)
Select "MIN" (parameter showing time for the following)
Select LEGS, (target instructing the aircraft to follow the length of the pattern for two minutes before turning).
Select "GO"

At which time the computer would know that upon reaching the specified location, it should go to a holding pattern of the desired configuration.

DETAILED DESCRIPTION OF THE PREFERRED EMBODIMENTS

Figure 1:
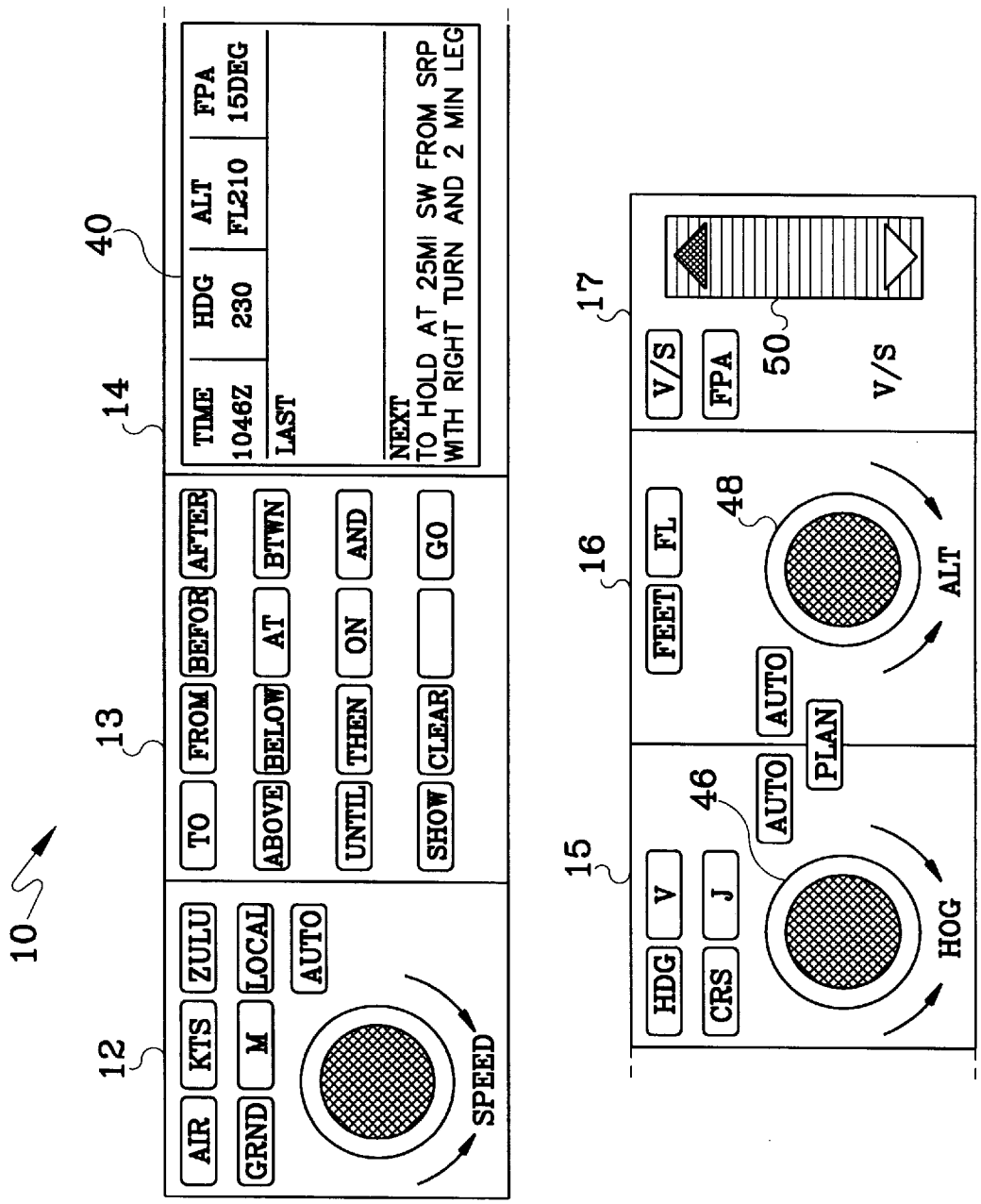
FIG. 1 shows a layout of one configuration of the control panel used by the pilot.

FIG. 1 shows one configuration for a control panel 10, which may be located on the top of the presently existing controls of an aircraft in a center section of the windshield known as the "glare shield". The control panel 10 is shown having six major sections: the "speed" section 12, the "action" section 13, the "display" section 14, the "heading" section 15, the "altitude" section 16 and the "vertical speed" (V/S) section 17. Sections 13 and 14 contain some of the features provided by the present invention while sections 12, 15, 16 and 17 are substantially the same as presently exist on some aircraft.

The "speed" section 12 contains 7 push buttons for related targets: "AIR" meaning "airspeed" "GRND" meaning "ground speed" "KTS" meaning "knots", meaning "mach" ZULU meaning "Greenwich mean time", "LOCAL" meaning "local time" and "AUTO" which, when activated, causes the values to be determined automatically (as based on the current flight plan). Section 12 also contains a knob 30 which is used to set the speed related target values that are desired.

The "action" section 13 contains 16 push buttons with the most common of the various actions that may be desired. (These and other less common actions may be listed in a pull down menu on the Navigation Display as will be described below). The 16 push buttons invoke words which can be used in sentences to explain a desired command. In the example given above, action words "TO", "AT", "FROM" "AND" and "GO" were used. Other commands may involve other combinations of buttons in Section 14 and other commands located elsewhere in the system as on the Navigation Display and Keyboard to be described below.

The "display" section 14 contains a display area 40 which shows, at the top, the commands being executed by the aircraft at the present time under areas titled "TIME" (when a time related target is selected) or "SPEED" (when a speed related target is selected), "HDG", "ALT" and "FPA" (when a flight path angle target is selected) or "V/S" (when a vertical speed related target is selected) and at the bottom, two areas titled "LAST" and "NEXT" respectively to show the last commands entered and to show the new commands as they are entered. It is seen that the "NEXT" area of the lower section reads: "TO HOLD AT 25 MI SW FROM SRP WITH RIGHT TURN AND 2 MIN LEG", which is the command of the example above.

The "heading" section 15, contains 5 more push buttons labeled: HDG meaning "heading", CRS meaning "course", V meaning "vector" J meaning "jetway" and AUTO which when activated causes the heading to be determined automatically (as based on the current flight plan), and a knob 46 which is used to set the desired lateral target value.

The "altitude" section 16 contains three push buttons labeled: "FEET", indicating the altitude in feet, "FL" indicating "flight level" and AUTO which when activated causes the altitude to be determined automatically (as based on the current flight plan). There is also a "PLAN" push button shared by the "heading" section 15 and the "altitude" section 16. The PLAN button, when activated, causes both the altitude and heading to be determined automatically (as based on the current flight plan). A knob 48 in "altitude" section 16 is used to set the desired vertical target value.

The "vertical speed" V/S section 17 contains two push buttons labeled "V/S" (vertical speed) and "FPA" (flight path angle) and a knurled knob 50 for changing the vertical velocity target.

It is seen that the control panel 10 allows easy access for the pilot to enter a number of commands. Some commands, however have to be entered elsewhere.

Figure 2:
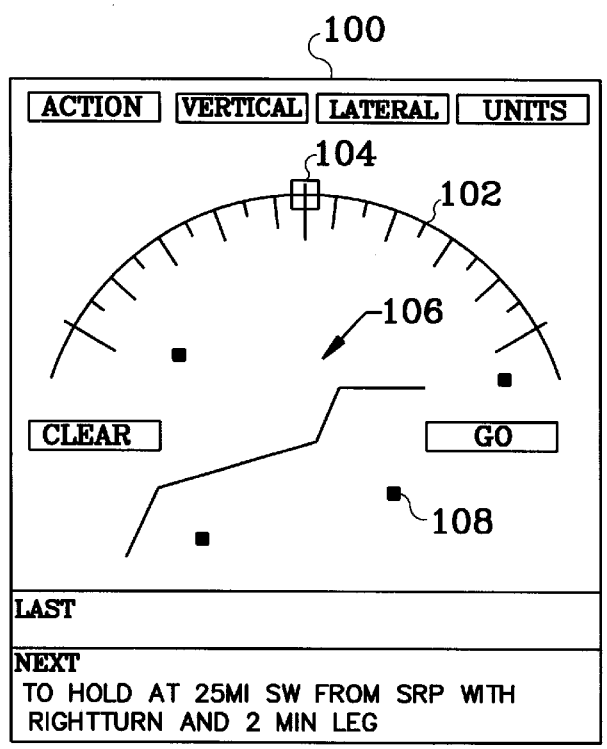
FIG. 2 shows a presently existing Navigation Display with several additions for use with the present invention; and, FIG. 3 is a block diagram of the system of the present invention.

Referring to FIG. 2, a partly standard navigation display 100 is shown having a semicircular dial 102 for showing the present heading by the position of a small square area 104 at the top and a map section 106 showing the path of the aircraft and the locations of various waypoints such as a dot 108 which might represent the waypoint SRP. In addition there are 6 "on screen" buttons which have been added for use with the present invention. The first is an "ACTION" button in the upper left portion of the display 100, which, when activated, produces a menu on the display showing a complete list of the various action categories available. A comprehensive list of such actions reads as follows:

AFTER
BEFORE
COPY
FROM
REPORT
START
UNTIL
AND
BELOW
ENTER
INHIBIT
REQUEST
THEN
UPDATE
AT
BETWEEN
FOLLOW
OF
SELECT
TO
VIA
ABOVE
AVOID
CLEAR
FOR
ON
SHOW
UNDO
WHEN

These action categories have been obtained by study of the above identified Air Traffic Controllers Manual and are believed to be quite complete. It should be understood, however, that some may be subtracted, others may be added and some changed as required to meet future requirements.

The second and third buttons read "VERTICAL" and "LATERAL" respectively. These two buttons are "target" categories. Those targets which are considered to be vertical will appear in a menu when the "VERTICAL" button is activated and may appear as follows:

ACCELERATION ALTITUDE
    ALTITUDE
    ANGLE
    BEST
    CLIMB
    CLIMB ANGLE
    CONSTRAINT
    CRUISE-CLIMB
    END OF DESCENT
    ENGINE OUT
    FEET
    FLIGHT LEVEL
    LEVEL
    MAX CLIMB ANGLE
    PROFILE
    SID
    STAR
    STEP POINT
    STEP SIZE
    TAKEOFF
    THRUST REDUCTION ALTITUDE
    TOP OF CLIMB
    TOP OF DESCENT
    TRANSITION ALTITUDE
    WIND

Those targets that are considered to be lateral will appear in a menu when the "LATERAL" button is activated and may appear as follows:

3D VOLUME
    4D VOLUME
    ABEAM POINT
    AIRPORT
    AIRWAY
    ALTERNATE
    APPROACH
    ARC
    BEARING
    BEST
    CIRCLE
    COMPANY ROUTE
    COURSE
    CRUISE
    DESTINATION
    DIRECTION
    DISCONTINUITY
    DISTANCE
    END OF DESCENT
    ENTRY
    EVEN
    FIX
    GATE
    GO AROUND
    HEADING
    HOLD
    INBOUND
    INTERSECTION
    LATITUDE
    LEGS
    LONGITUDE
    MISSED APPROACH
    NAVAID
    ODD
    OFFSET
    OUTBOUND
    PATTERN
    PLAN
    POSITION
    POSITION REPORT
    RADIAL
    ROUTE
    RUNWAY
    RUNWAY EXTENSION
    SID
    STAR
    STEP POINT
    TAKEOFF

THRESHOLD
TOP OF CLIMB
TOP OF DESCENT
TRACK
WAYPOINT
WIND

These target commands are also believed complete but may be changed, removed or others may be added to meet requirements.

The fourth push button is labeled "UNITS" and, when activated, will show a menu of parameters such as:

CIRCLING
DEGREES
DEGREES CELSIUS
DEGREES FAHRENHEIT
EAST
FEET
FLIGHT LEVEL
HG
HOURS
KNOTS
LATITUDE
LEFT
LOCAL
LONG
LONGITUDE
MACH
MILES
MINUTES
NAUTICAL MILES
NORTH
POUNDS
QFE
QNH
RIGHT
SECONDS
SHORT
SOUTH
STRAIGHT
WEST
ZULU

These parameters, while believed complete, may be changed, removed or others may be added as requirements dictate.

The fifth button is labeled "CLEAR" and, when activated, clears the display of the commands that appear there.

The sixth button is labeled "GO" and, when activated, causes the computer to begin operating on the displayed commands as was the case with the "GO" button in FIG. 1.

At the bottom of the display 100 are two long sections labeled "LAST" and "NEXT" for displaying the commands in a manner like that described in display 40 of FIG. 1. The "LAST" section displays the last set of commands entered into the system and the "NEXT" section displays the next set of commands to be entered into the system. As can be seen, the "NEXT" section is displaying "TO HOLD AT 25 MI SW FROM SRP WITH RIGHT TURN AND 2 MIN LEG" which is the command of the example above.

Any one of the items in the pull down menus set forth above, may be highlighted by the pilot and entered onto the displays 40 of FIG. 1 and 100 of FIG. 2 for building a command string. When the desired string is displayed, the pilot activates the "GO" button in section 14 of FIG. 1 or the "GO" button in FIG. 2 to cause the computer to execute the next commands.

In addition to the control panel 10 and the display 100, there may be other means to enter data for display on the monitors and to be entered into the computer. A keyboard is usually associated with a flight management system and may be used to make entries. Voice commands are possible inputs and preexisting commands built in to the flight plan may also be displayed and inputted to the computer. It may be possible for the air traffic controller to directly input data into the system. Accordingly, the use of the control panel and the heading display herein is to be considered exemplary and not limiting to the invention.

Figure 3:
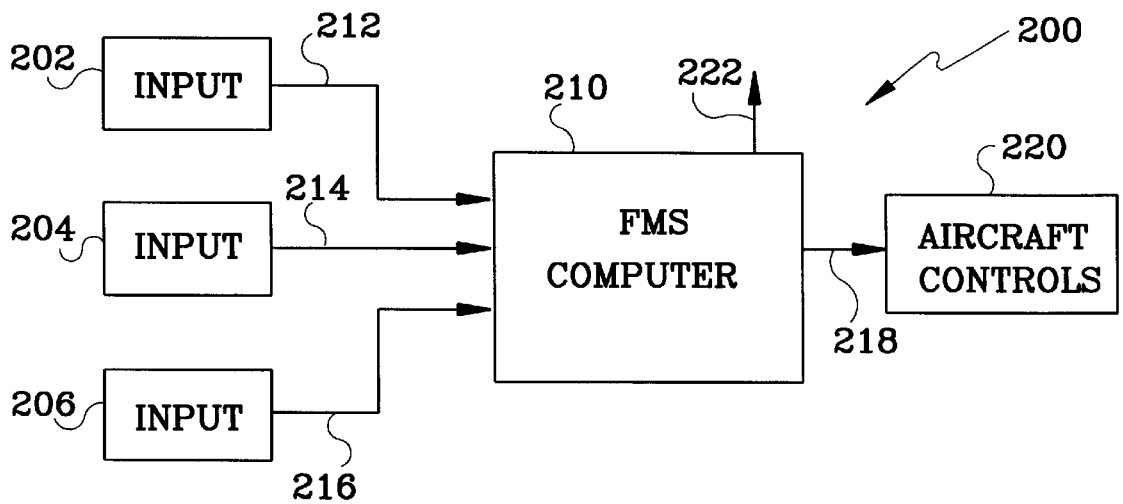

FIG. 3 shows a block diagram of a system 200 for use with the present invention. In FIG. 3, three "INPUT" boxes 202, 204 and 206 are shown which may represent the inputs from control panel 10, the navigation display 100 and other input devices such as a keyboard and voice command respectively. The inputs boxes are connected to the Flight Management Computer (FMS) 210 by connections 212, 214 and 216 respectively. FMS computer 210 will be programmed to recognize the air traffic controller syntax inputs from input devices 202, 204 and 206 using a conventional slot and frame grammar to specify how actions, targets and units can be combined in orders that can be interpreted by the flight guidance system. Such methods are well known in computer science and consist of restricted vocabularies, the words of which have predefined attributes, and rules for their combination. The outputs of the FMS computer are shown as an arrow 218 connected to the aircraft controls shown generally as a box 220. If the syntax is incorrect, the FMS computer will inform the pilot with a warning to the monitors indicating an error via a feedback line shown as arrow 222.

It is thus seen that we have provided an improved way of controlling an aircraft in accordance with a language resembling the air traffic control syntax so as to enable the pilot to comply with required changes in flight plan in a simple and more rapid manner. Many changes will occur to those having skill in the art, as for example, use of different specific action, target and parameter nomenclature, different arrangements of the buttons, different ways of activating the displays and the computer and different arrangements of the displays and other components. We therefore do not wish to be limited to the specific disclosures used in connection with the description of the preferred embodiments.

The embodiments of the invention in which an exclusive property or right is claimed are defined as follows:

1. Apparatus for use with an aircraft having aircraft controls to produce desired aircraft maneuvers and a flight management computer to provide inputs to the aircraft controls, comprising:

a plurality of input members each operable to provide an "action" command to the computer, a plurality of input members each operable to provide a "target" command to the computer:

a plurality of input members each operable to provide a "parameter" command to the computer, wherein said computer is programmed to recognize the "action" "target", and "parameter" commands from said input members and to specify how the "action", "target", and "parameter" commands are to be interpreted by the aircraft controls;

a display for showing "action", "target" and "parameter" commands in the order in which they were entered; and, a command input member operable to cause the computer to operate in accordance with the commands displayed and to provide an output that can be interpreted by the aircraft controls to produce a desired maneuver, wherein the "action" commands available to be displayed include a majority of the following:

AFTER
BEFORE
COPY
FROM
REPORT
START
UNTIL
AND
BELOW
ENTER
INHIBIT
REQUEST
THEN
UPDATE
AT
BETWEEN
FOLLOW
OF
SELECT
TO
VIA
ABOVE
AVOID
CLEAR
FOR
ON
SHOW
UNDO
WHEN.

2. Apparatus for use with an aircraft having aircraft controls to produce desired aircraft maneuvers and a flight management computer to provide inputs to the aircraft controls, comprising:

a plurality of input members each operable to provide an "action" command to the computer:

a plurality of input members each operable to provide a "target" command to the computer;

a plurality of input members each operable to provide a "parameter" command to the computer;

wherein said computer is programmed to recognize the "action", "target", and "parameter" commands from said input members and to specify how the "action", "target", and "parameter" commands are to be interpreted by the aircraft controls;

a display for showing "action", "target" and "parameter" commands in the order in which they were entered; and, a command input member operable to cause the computer to operate in accordance with the commands displayed and to provide an output that can be interpreted by the aircraft controls to produce a desired maneuver, wherein the "target" commands available to be displayed include a majority of the following:

ACCELERATION ALTITUDE
ALTITUDE
ANGLE
BEST
CLIMB
CLIMB ANGLE
CONSTRAINT
CRUISE-CLIMB
END OF DESCENT
ENGINE OUT
FEET
FLIGHT LEVEL
LEVEL
MAX CLIMB ANGLE
PROFILE
SID
STAR
STEP POINT
STEP SIZE
TAKEOFF
THRUST REDUCTION ALTITUDE
TOP OF CLIMB
TOP OF DESCENT
TRANSITION ALTITUDE
WIND
3D VOLUME
4D VOLUME
ABEAM POINT
AIRPORT
AIRWAY
ALTERNATE
APPROACH
ARC
BEARING
BEST
CIRCLE
COMPANY ROUTE
COURSE
CRUISE
DESTINATION
DIRECTION
DISCONTINUITY
DISTANCE
END OF DESCENT
ENTRY
EVEN
FIX
GATE
GO AROUND
HEADING
HOLD
INBOUND
INTERSECTION
LATITUDE
LEGS
LONGITUDE

MISSED APPROACH
NAVAID
ODD
OFFSET
OUTBOUND
PATTERN
PLAN
POSITION
POSITION REPORT
RADIAL
ROUTE
RUNWAY
RUNWAY EXTENSION
SID
STAR
STEP POINT
TAKEOFF
THRESHOLD
TOP OF CLIMB
TOP OF DESCENT
TRACK
WAYPOINT
WIND.

3. Apparatus for use with an aircraft having aircraft controls to produce desired aircraft maneuvers and a flight management computer to provide inputs to the aircraft controls comprising:

a plurality of input members each operable to provide an "action" command to the computer;

a plurality of input members each operable to provide a "target" command to the computer;

a plurality of input members each operable to provide a "parameter" command to the computer;

wherein said computer is programmed to recognize the "action", "target", and "parameter" commands from said input members and to specify how the "action", "target", and "parameter" commands are to be interpreted by the aircraft controls;

a display for showing "action", "target" and "parameter" commands in the order in which they were entered; and, a command input member operable to cause the computer to operate in accordance with the commands displayed and to provide an output that can be interpreted by the aircraft controls to produce a desired maneuver, wherein the "parameter" commands available to be displayed include a majority of the following:

CIRCLING
DEGREES
DEGREES CELSIUS
DEGREES FAHRENHEIT
EAST
FEET
FLIGHT LEVEL
HG
HOURS
KNOTS
LATITUDE
LEFT
LOCAL
LONG
LONGITUDE
MACH
MILES
MINUTES
NAUTICAL MILES
NORTH
POUNDS
QFE
QNH
RIGHT
SECONDS
SHORT
SOUTH
STRAIGHT
WEST
ZULU.

4. Apparatus for use with an aircraft having aircraft controls to produce desired aircraft maneuvers and a flight management computer to provide inputs to the aircraft controls, comprising:

a plurality of input members each operable to provide an "action" command to the computer;

a plurality of input members each operable to provide a "target" command to the computer;

a plurality of input members each operable to provide a "parameter" command to the computer;

wherein said computer is programmed to recognize the "action", "target", and "parameter" commands from said input members and to specify how the "action", "target", and "parameter" commands are to be interpreted by the aircraft controls;

a display for showing "action", "target" and "parameter" commands in the order in which they were entered; and, a command input member operable to cause the computer to operate in accordance with the commands displayed and to provide an output that can be interpreted by the aircraft controls to produce a desired maneuver, wherein the "action" commands available to be displayed include at least the "and", "at" and "then" commands from the following:

AFTER
BEFORE
COPY
FROM
REPORT
START
UNTIL
AND
BELOW
ENTER
INHIBIT
REQUEST
THEN
UPDATE
AT
BETWEEN
FOLLOW

OF
SELECT
TO
VIA
ABOVE
AVOID
CLEAR
FOR
ON
SHOW
UNDO
WHEN.

5. Apparatus for use with an aircraft having aircraft controls to produce desired aircraft maneuvers and a flight management computer to provide inputs to the aircraft controls, comprising:

a plurality of input members each operable to provide an "action" command to the computer;

a plurality of input members each operable to provide a "target" command to the computer;

a plurality of input members each operable to provide a "parameter" command to the computer;

wherein said computer is programmed to recognize the "action", "target", and "parameter" commands from said input members and to specify how the "action", "target", and "parameter" commands are to be interpreted by the aircraft controls;

a display for showing "action", "target" and "parameter" commands in the order in which they were entered; and, a command input member operable to cause the computer to operate in accordance with the commands displayed and to provide an output that can be interpreted by the aircraft controls to produce a desired maneuver, wherein the "action" commands available to be displayed include at least the "and", "at" and "then" commands from the following:

AFTER
BEFORE
COPY
FROM
REPORT
START
UNTIL
AND
BELOW
ENTER
INHIBIT
REQUEST
THEN
UPDATE
AT
BETWEEN
FOLLOW
OF
SELECT
TO
VIA
ABOVE
AVOID
CLEAR
FOR
ON
SHOW
UNDO
WHEN;

wherein the "target" commands available to be displayed include at least a majority of the following:

ACCELERATION ALTITUDE
ALTITUDE
ANGLE
BEST
CLIMB
CLIMB ANGLE
CONSTRAINT
CRUISE-CLIMB
END OF DESCENT
ENGINE OUT
FEET
FLIGHT LEVEL
LEVEL
MAX CLIMB ANGLE
PROFILE
SID
STAR
STEP POINT
STEP SIZE
TAKEOFF
THRUST REDUCTION ALTITUDE
TOP OF CLIMB
TOP OF DESCENT
TRANSITION ALTITUDE
WIND
3D VOLUME
4D VOLUME
ABEAM POINT
AIRPORT
AIRWAY
ALTERNATE
APPROACH
ARC
BEARING
BEST
CIRCLE
COMPANY ROUTE
COURSE
CRUISE
DESTINATION
DIRECTION
DISCONTINUITY
DISTANCE
END OF DESCENT
ENTRY
EVEN
FIX
GATE

GO AROUND
HEADING
HOLD
INBOUND
INTERSECTION
LATITUDE
LEGS
LONGITUDE
MISSED APPROACH
NAVAID
ODD
OFFSET
OUTBOUND
PATTERN
PLAN
POSITION
POSITION REPORT
RADIAL
ROUTE
RUNWAY
RUNWAY EXTENSION
SID
STAR
STEP POINT
TAKEOFF
THRESHOLD
TOP OF CLIMB
TOP OF DESCENT
TRACK
WAYPOINT
WIND; and,
wherein the "parameter" commands available to be displayed include at least a majority of the following:

CIRCLING
DEGREES
DEGREES CELSIUS
DEGREES FAHRENHEIT
EAST
FEET
FLIGHT LEVEL
HG
HOURS
KNOTS
LATITUDE
LEFT
LOCAL
LONG
LONGITUDE
MACH
MILES
MINUTES
NAUTICAL MILES
NORTH
POUNDS
QFE
QNH
RIGHT
SECONDS
SHORT
SOUTH
STRAIGHT
WEST
ZULU.

* * * * *